(12) United States Patent
Bianco et al.

(10) Patent No.: US 7,338,211 B2
(45) Date of Patent: Mar. 4, 2008

(54) WHEEL BEARING ASSEMBLIES INCORPORATING SENSING ARRANGEMENTS

(75) Inventors: Carlo Roberto Bianco, Stapleford (GB); Ian Taylor Cook, West Bridgeford (GB); Anthony Francois Patrick Gauthier, Senlisse (FR)

(73) Assignee: NSK Europe Ltd, Maidenhead, Berkshire (GB)

( * ) Notice: Subject to any disclaimer, the term of this patent is extended or adjusted under 35 U.S.C. 154(b) by 803 days.

(21) Appl. No.: 10/850,859

(22) Filed: May 21, 2004

(65) Prior Publication Data

US 2005/0259900 A1   Nov. 24, 2005

(51) Int. Cl.
*F16C 19/52*    (2006.01)
*F16C 33/41*    (2006.01)
(52) U.S. Cl. ..................... 384/448; 384/544
(58) Field of Classification Search ............... 384/448, 384/544
See application file for complete search history.

(56) References Cited

U.S. PATENT DOCUMENTS 5,026,178 A    6/1991   Ballhaus
5,046,867 A    9/1991   Hilby et al.

FOREIGN PATENT DOCUMENTS

| DE | 2941564   | 4/1987  |
|----|-----------|---------|
| EP | 0887647   | 12/1998 |
| FR | 2258223   | 7/1985  |
| GB | 1353306   | 5/1974  |
| JP | 63-176761 | 7/1988  |

*Primary Examiner*—William C. Joyce
(74) *Attorney, Agent, or Firm*—Gauthier & Connors LLP (57) ABSTRACT

A wheel bearing assembly including inner and outer bearing rings, one of which is intended to rotate and the other of which is intended to remain stationary. The assembly also includes two sets of rolling elements between the rings and in angular contact with tracks defined by the rings. Each set of rolling elements is spaced in the direction of the axis of rotation with each set of rolling elements retained by one of two cages. The assembly further includes a sensing arrangement having at least two annular encoders with alternate north and south magnetic poles and at least two sensors operably associated with the encoders and each serving to provide electrical signals generated by the passage of the poles of the arranged encoder. One of the encoders is mounted on the rotatable one of the bearing rings. The other encoder is mounted on one of the cages and each of the sensors and encoders is disposed axially, between the sets of rolling elements.

10 Claims, 9 Drawing Sheets

FIG. 10 though the tracks 13,14 during rotation of the inner ring 10. In accordance with the invention a sensing arrangement 20 is mounted in-board of the bearing between the sets of balls 12. This sensing arrangement 20 is composed of two annular encoders 21, 22 and two sensors 23, 24. The encoders 21, 22 can take the form described

WHEEL BEARING ASSEMBLIES INCORPORATING SENSING ARRANGEMENTS

BACKGROUND OF THE INVENTION

1. Field of the Invention

The present invention relates to vehicle wheel bearing assemblies and more particularly to such assemblies equipped with sensing arrangements for sensing rotary speed or position.

2. Description of the Prior Art

In this field there have been many prior art constructions which can be taken to form the background for the invention. In general, rotary bearings employing sensing arrangements for sensing rotary speed or position can employ a prefabricated annular component made of polymeric material containing ferrous material which is treated to form alternate north and south magnetic poles, see for example, U.S. Pat. No. 5,089,817. Such a component referred to as an encoder can be mounted in the assembly to cause the magnetic poles to pass alongside a sensor, such as a Hall effect sensor, which generates a pulsed electrical signal.

SUMMARY OF THE INVENTION

An object of the present invention is to provide improved assemblies and sensing arrangements of the aforementioned kind.

Accordingly the present invention provides a wheel bearing assembly composed of inner and outer bearing rings, one of which is intended to rotate and the other of which is intended to remain stationary, two sets of rolling elements between the rings and in angular contact with tracks defined by the rings, each set of rolling elements being spaced in the direction of the axis of rotation with each set of rolling elements retained by one of two cages and a sensing arrangement composed of at least two annular encoders with alternate north and south magnetic poles and at least two sensors operably associated with the encoders and each serving to provide electrical signals generated by the passage of the poles of the associated encoder;

wherein one of the encoders is mounted on the rotatable one of the bearing rings and, the other of the encoders is mounted on one of the cages and each of said sensors and encoders is disposed axially, between the sets of rolling elements.

The encoder can be mounted on different components of the assembly such as on one of the cages and on the rotatable bearing ring. This enables the signals generated by the sensors to be compared, for example. The encoders can be orientated with their magnetic poles parallel to the rotational axis thus in an axial orientation or radial to this axis thus in a radial orientation or in both axial and radial orientations. The sensors and encoders may be built into the bearing in a protected position between the sets of rolling elements. To locate the sensors use can be made of a housing or a mounting as described hereinafter.

In other embodiments the sensors and encoders lie outboard of the bearing and the wheel assembly for ease of installation or removal.

A second aspect of the present invention provides a wheel bearing assembly composed of inner and outer bearing rings, one of which is intended to rotate and the other of which is intended to remain stationary, sets of rolling elements between the rings and in angular contact with tracks defined by the rings, the sets of rolling elements being spaced in the direction of the axis of rotation with each set of rolling elements retained by a cage and a sensing arrangement composed of at least two annular encoders with alternate north and south magnetic poles and at least two sensors operably associated with the encoders and each serving to provide electrical signals generated by the passage of the poles of the associated encoder;

wherein one of the encoders is mounted on the rotatable one of the bearing rings and, the other of the encoders is mounted on one of the cages and wherein the inner bearing ring is secured onto a wheel hub, a cover is located on the other bearing ring to enclose the sensors and is carried by an axial portion of the cover.

The invention may be understood more readily, and various other aspects and features of the invention may become apparent, from consideration of the following description.

BRIEF DESCRIPTIONS OF THE DRAWINGS

Wheel bearing assemblies embodying the invention will now be described, by way of examples only, with reference to the accompanying drawings, wherein.

DETAILED DESCRIPTION OF THE INVENTION

The construction of the various wheel bearing assemblies 9 illustrated throughout the accompanying drawings is well known per se and like reference numerals are used to designate the same components.

Figure 1:
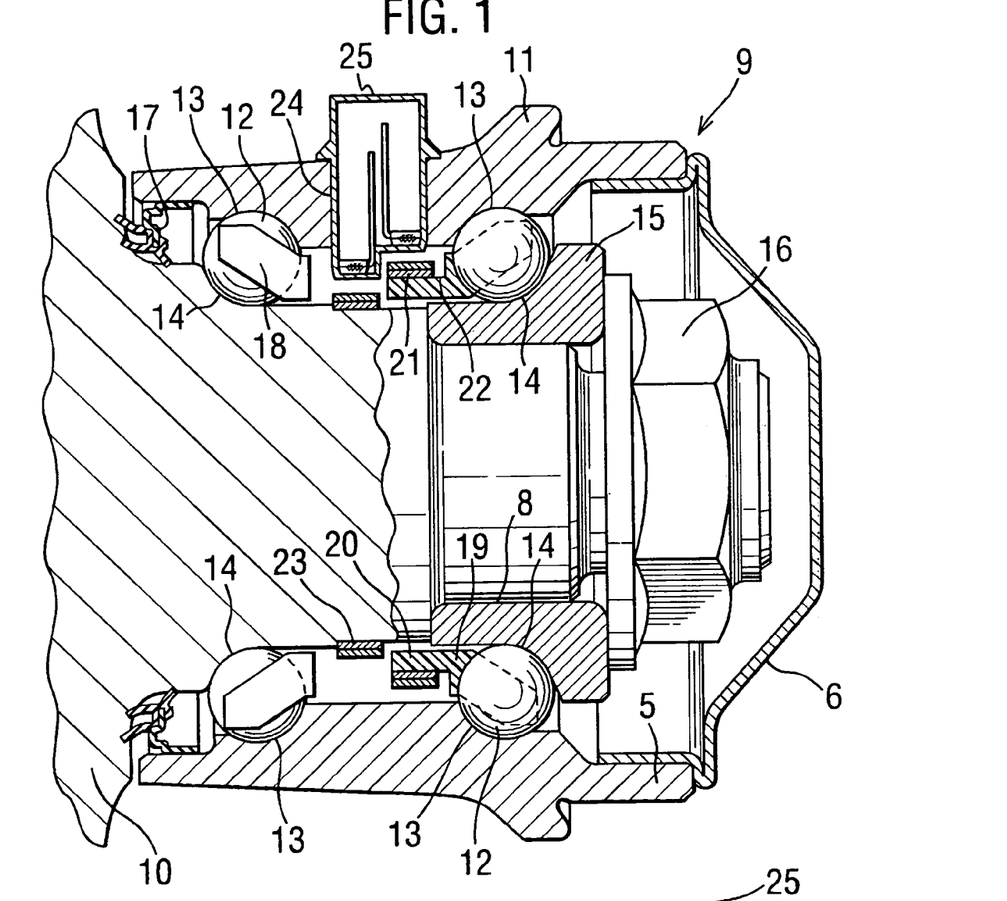
FIG. 1 is a schematic sectional side view of a first embodiment of a wheel bearing assembly.

Referring initially to FIG. 1, there is an inner bearing ring 10, an outer bearing ring 11 and two sets or rows of rolling elements in the form of balls 12 therebetween. The balls 12 make angular contact with running tracks 13,14 in the rings 10,11. In this assembly, the right-hand or innermost track 14 of the ring 10 is actually formed by a separate support 15 located in a recess 8 in the inner ring 10. A wheel hub is fixed to or integral with the inner ring 10 and receives a nut 16 which locates on the support 15. A detachable pressing fits into an outer projecting region 5 of the outer ring 11 and acts as a cover 6 for the nut 16. At the opposite left-hand or outermost end regions of the rings 10, 11 there is a seal 17. Each set of balls 12 is fitted into a cage 18, 19 made of plastics material. As is known, the cages 18,19 maintain separation between the balls 12 and guide the balls 12 making up each set for progression around the tracks 13,14. During use, the inner ring 10 rotates with the wheel hub whilst the outer ring 11 remains stationary. The balls 12 progressively roll in relation to the tracks 13, 14.

Figure 2:
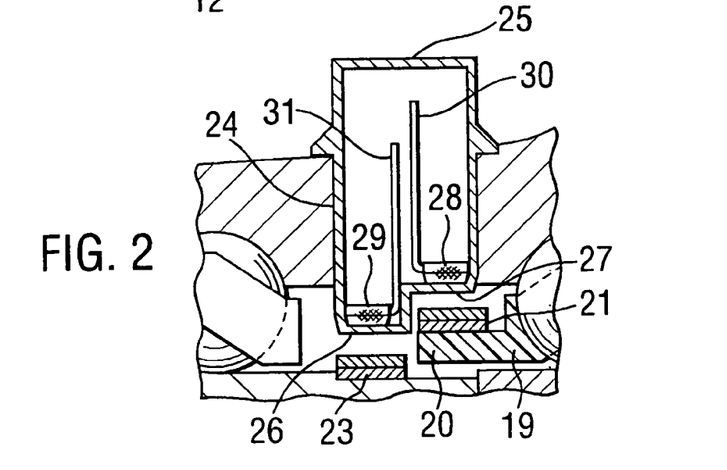
FIG. 2 is an enlarged view of part of the assembly shown in FIG. 1.

In accordance with the invention, the assembly 9 is equipped with a sensing arrangement designed to provide an indication of rotary speed or position. As shown in FIGS. 1 and 2, the cage 19 has an axial projection 20 which extends outwardly towards the other ball set. A first pre-formed annular encoder 21 with alternate axially-orientated north and south magnetic poles is fitted onto an axial surface 22 of the projection 20 to confront the inner surface of the outer ring 11. A second pre-formed annular encoder 23 with alternate north and south axially-orientated magnetic poles is fitted onto the inner surface of the inner bearing ring 10. The encoders 21, 23 are axially and radially offset in relation to one another.

A radial bore 24 in the outer ring 11 receives a housing 25. As shown in FIG. 2, the inner end of the housing 25 has a stepped profile with end walls 26, 27 offset in the radial direction. The end walls 26, 27 mount sensors 28, 29 which detect the passage of the magnetic poles of the encoders 21, 23 and provide pulsed electrical signals with a repetition frequency depending on the movement of the poles of the encoders 21, 23. The signals are carried on leads 30, 31 connected with the sensors 28, 29. The signals from the sensor 28 represent the rotary speed of the cage 19 while the signals from the sensor 29 represent the rotary speed of the inner ring 10. The signals can be used in a variety of ways quite separately and independently or combined or compared with one another.

Figure 3:
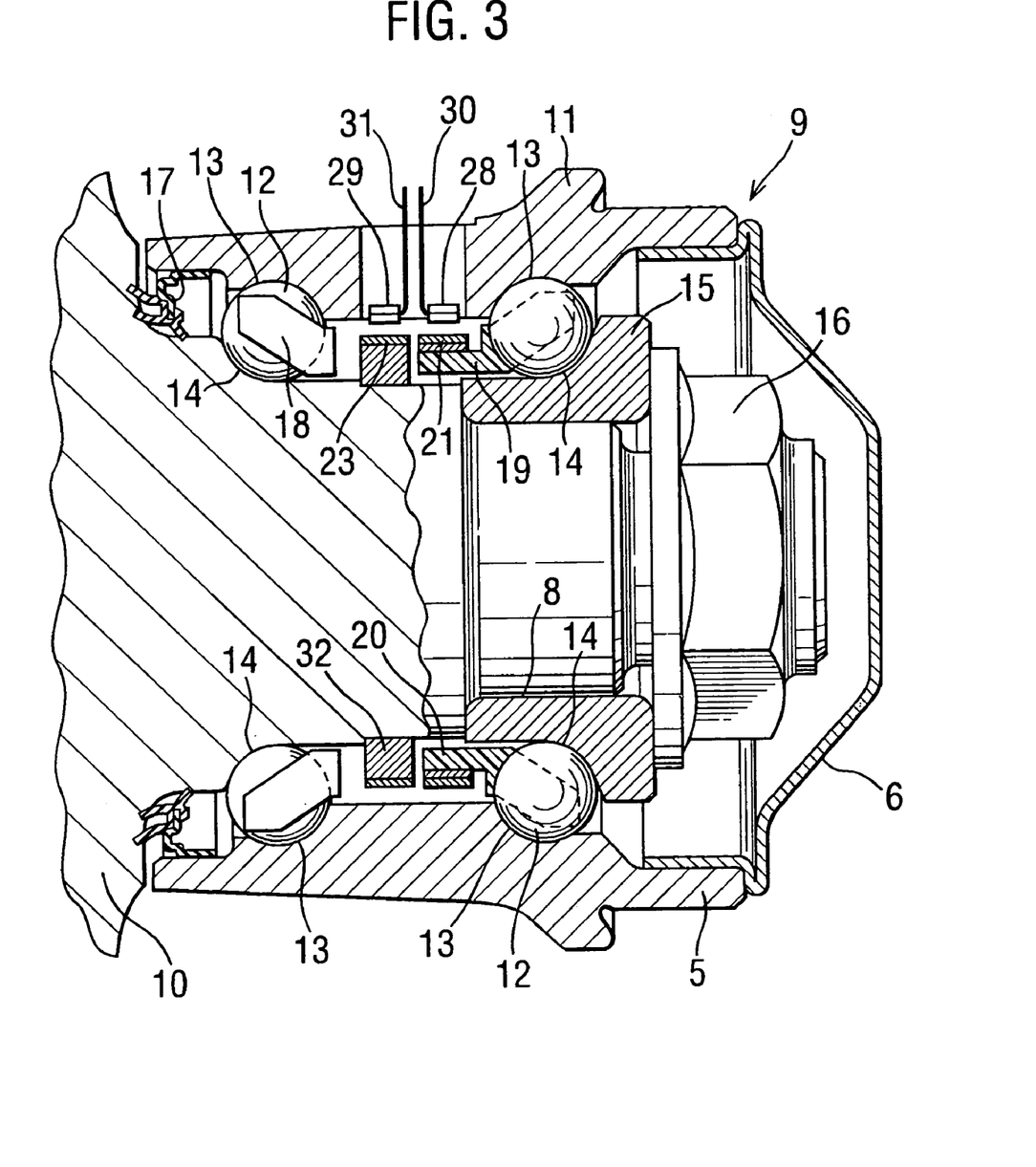
FIG. 3 is a schematic sectional side view of a second embodiment of a wheel bearing assembly.

FIG. 3 shows a modified form of the sensing arrangement shown in FIGS. 1 and 2. In this arrangement, the encoder 23 is mounted on a support ring 32 fitted to the inner surface of the inner bearing ring 10 and the magnetic poles of the encoders 22, 23 lie in a common axial plane. The associated sensors 28, 29 are likewise orientated in a common axial plane corresponding to the inner surface of the outer ring 11. The sensors 28, 29 are mounted at the inner end of a bore 24 in the ring 11. The leads 30, 31 are used to support and position the sensors 28, 29 and these leads 30, 31 emerge from the bore 24.

In the embodiments described and illustrated so far the encoders and sensors 21, 23, 28, 29 are all inboard between the sets of balls 12.

Figure 4:
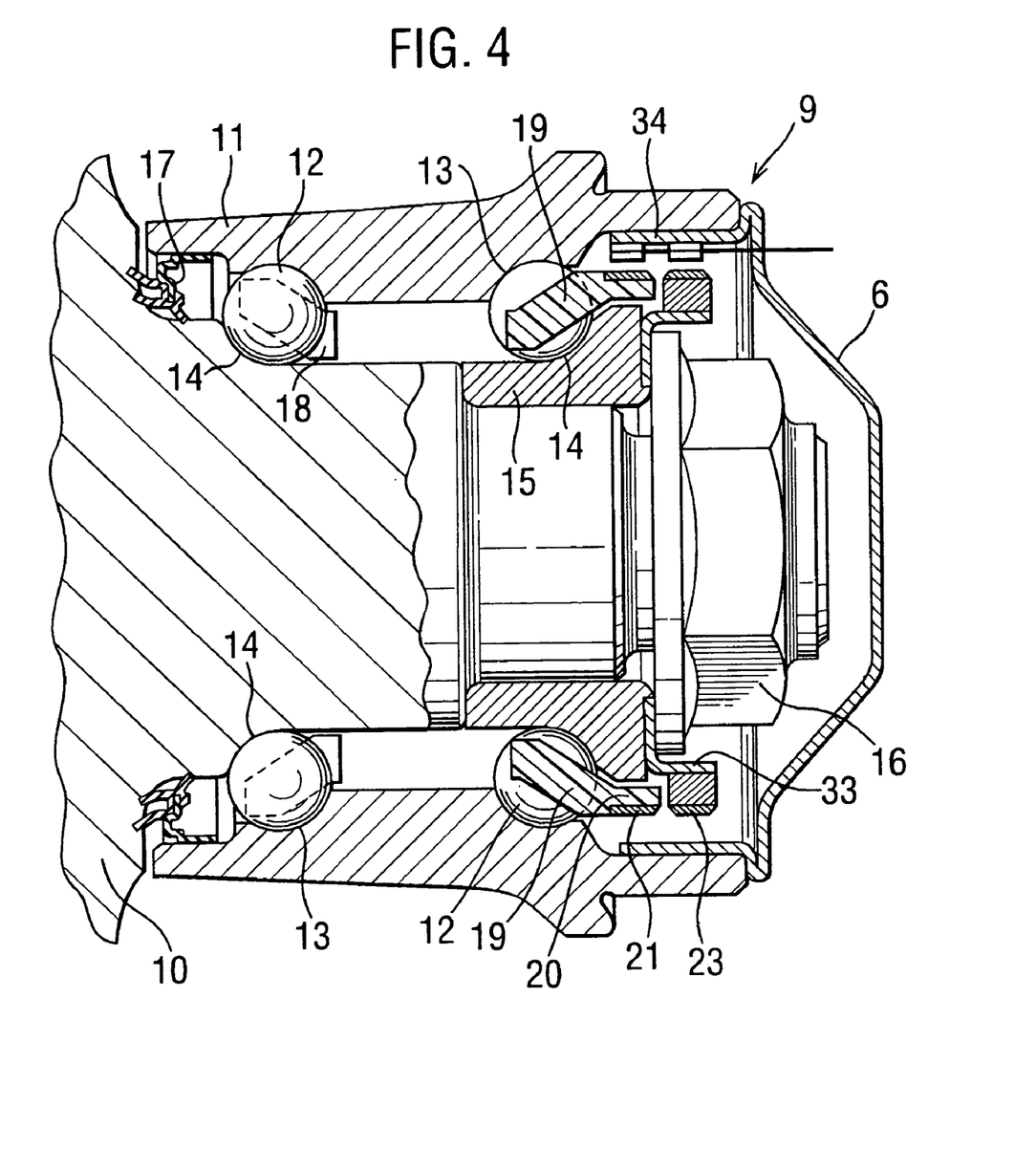
FIG. 4 is a schematic sectional side view of a third embodiment of a wheel bearing assembly.

In other constructions the encoders and sensors can be outside the bearing interior. Thus, FIG. 4 shows another sensing arrangement with two encoders 21, 23 and two sensors 28, 29. The first encoder 21 is again located on an axial projection 20 of the cage 19 but in this embodiment the projection 20 extends outwardly rather than inwardly. The second encoder 23 is mounted on an axial region of a further L-shaped ring 33 disposed outside the bearing. A radial region of this ring 33 is clamped by the nut 16 against the support 15. As with the arrangement shown in FIG. 3, the magnetic poles of the encoders 21, 23 lie in a common axial plane as do the opposed associated sensors 28, 29 which are now supported on an axial portion 34 of the cover 6.

Figure 5:
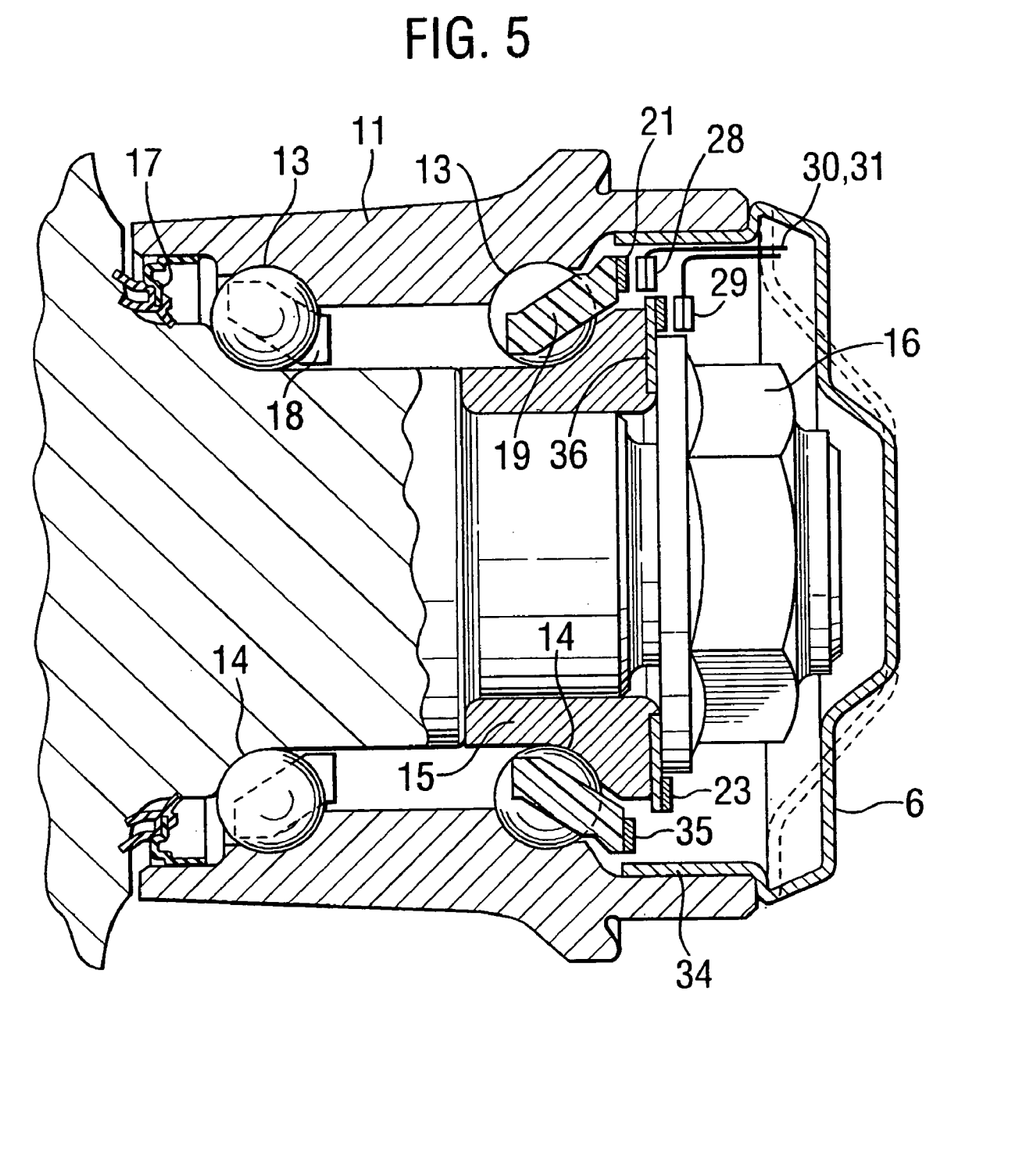
FIG. 5 is a schematic sectional side view of a fourth embodiment of a wheel bearing assembly.
Figure 6:
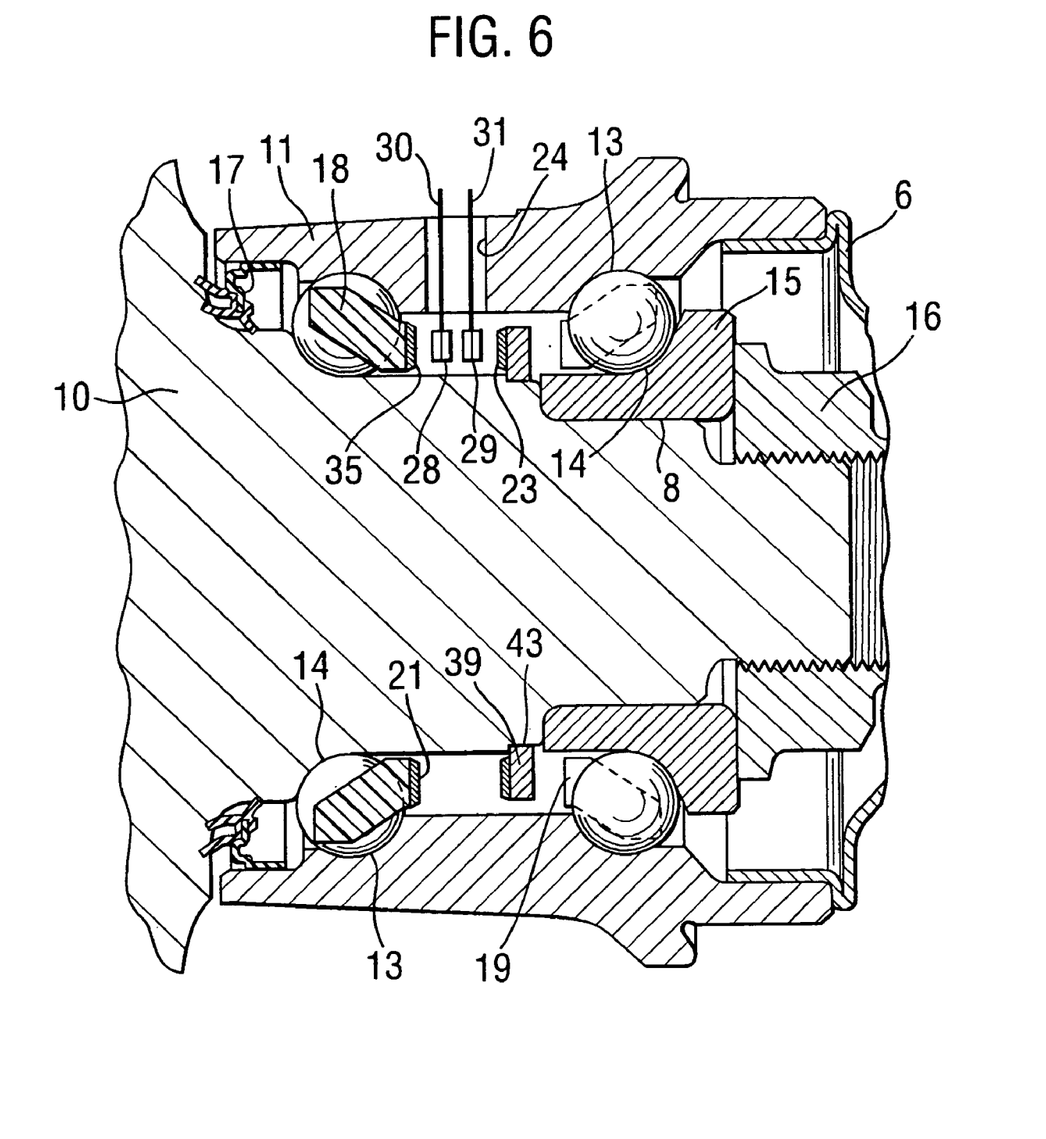
FIG. 6 is a schematic sectional side view of a fifth embodiment of a wheel bearing assembly.

In the assemblies and arrangements depicted in FIGS. 1 to 4 the encoders 21, 23 and the sensors 28, 29 are located predominantly in the axial disposition. FIGS. 5 and 6 show somewhat different arrangements where the encoders 21, 23 and the sensors 28, 29 take a radial disposition. In the arrangement shown in FIG. 5 the encoder 21 is mounted on an outermost radial surface 35 of the outer cage 19 so the magnetic poles take a radial orientation. The encoder 23 is here mounted on a plane washer 36 clamped between the nut 16 and the support 15. As can be seen, the encoders 21, 23 are both axially and radially offset. The associated sensors 28, 29 are likewise axially and radially offset and suspended, for example, by a deformable sleeving surrounding the leads 30, 31 and bent into an L-shape. The sleeving can be secured to the axial portion 34 of the cover 6 in any suitable fashion.

FIG. 6 shows another arrangement with the encoders 21, 23 and the sensors 28, 29 all in a radial orientation. In this arrangement, the encoder 21 is supported on the innermost radial end face 35 of the cage 18. The encoder 23 confronts the encoder 21 and is radially aligned but axially offset with respect to the encoder 21. A support ring 39 fits into a recess 43 in the inner surface of the inner bearing ring 10 and the support ring 39 serves to mount the encoder 23. The associated sensors 28, 29 are again suspended by their leads 30, 31 in the sensor vicinity of the encoders 21, 23. The leads 30, 31 pass through the bore 24 in the bearing ring 11.

Figure 7:
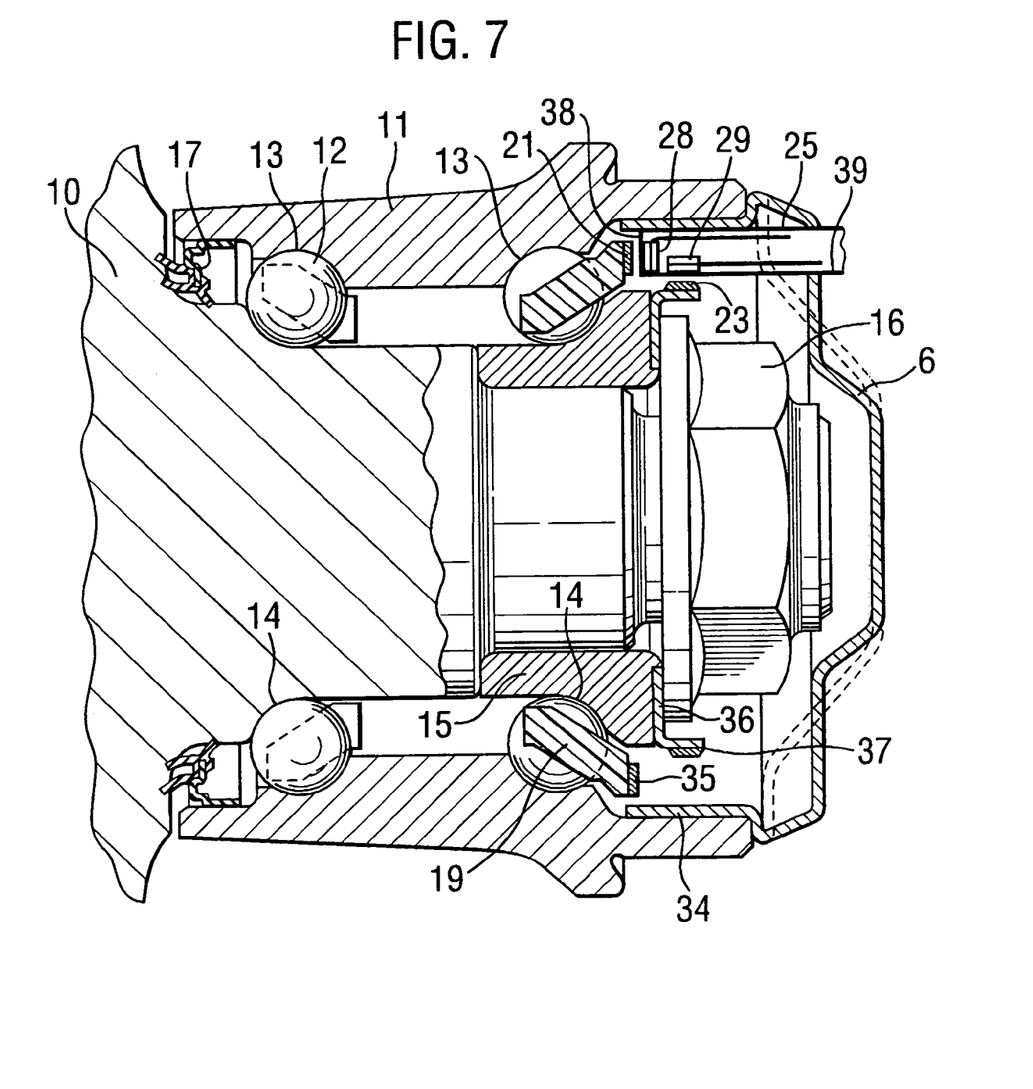
FIG. 7 is a schematic sectional side view of a sixth embodiment of a wheel bearing assembly.

FIG. 7 shows an arrangement where the encoders 21, 23 and the sensors 28, 29 are orientated both radially and axially. Thus, the encoder 21 is again mounted on the radial surface 35 of the cage 18 as is in the embodiment shown in FIG. 5. However the washer 36 is now L-shaped with an axial region 37 supporting the encoder 23 in an axial orientation generally normal to the orientation of the encoder 21. A tubular housing 25 again secured to the axial portion 34 of the cover 6 accommodates the sensors 28, 29. The housing 25 has a radially orientated inner end wall 38 supporting the sensor 28 in the sensing vicinity of the encoder 21 and an axial wall 39 supporting the sensor 29 in the sensing vicinity of the encoder 23.

Figure 8:
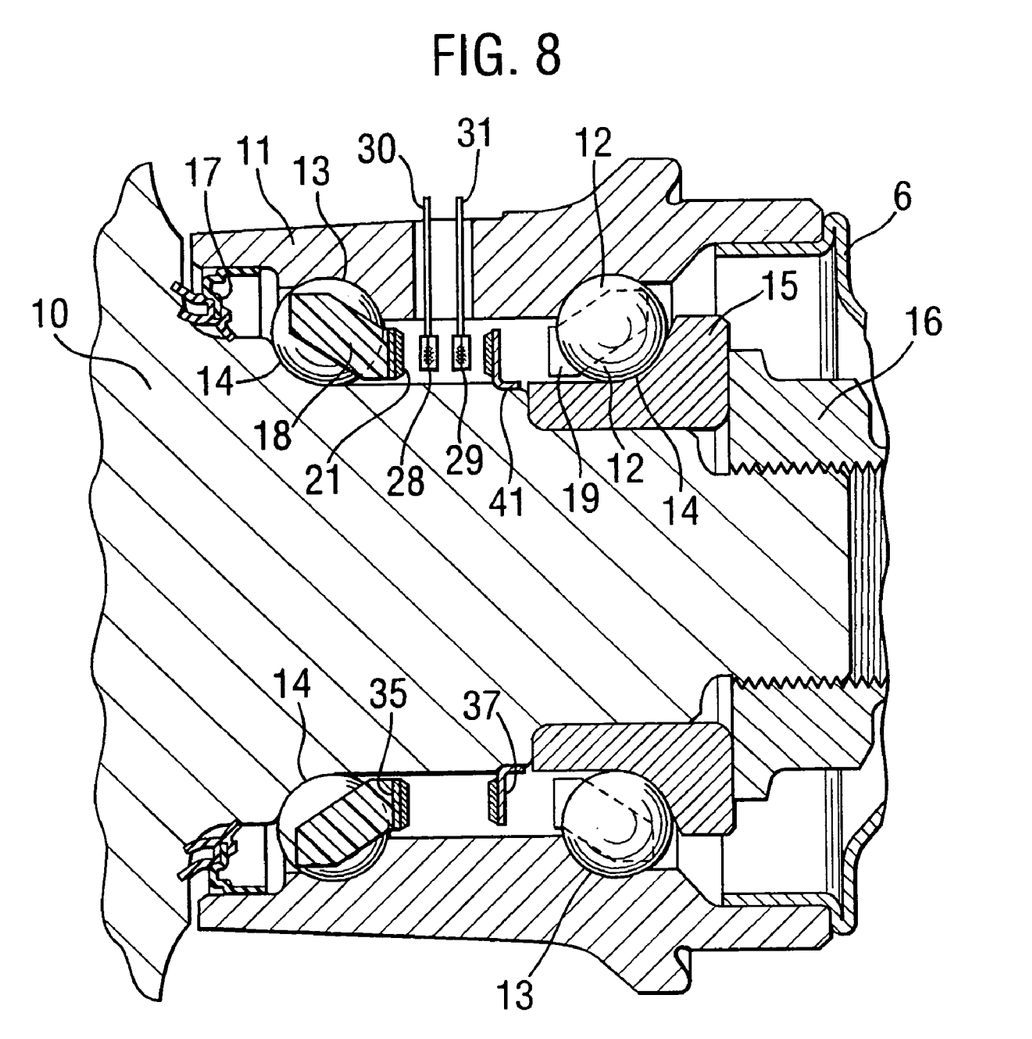
FIG. 8 is a schematic sectional side view of a seventh embodiment of a wheel bearing assembly

FIG. 8 depicts a similar arrangement to FIG. 6 but here the shape and mass of the support ring 37 for the encoder 21 is modified. The ring 39 is now L-shaped and has an axial flange portion 41 fitted directly to the inner surface of the inner ring 10 which is no longer provided with a recess.

Figure 9:
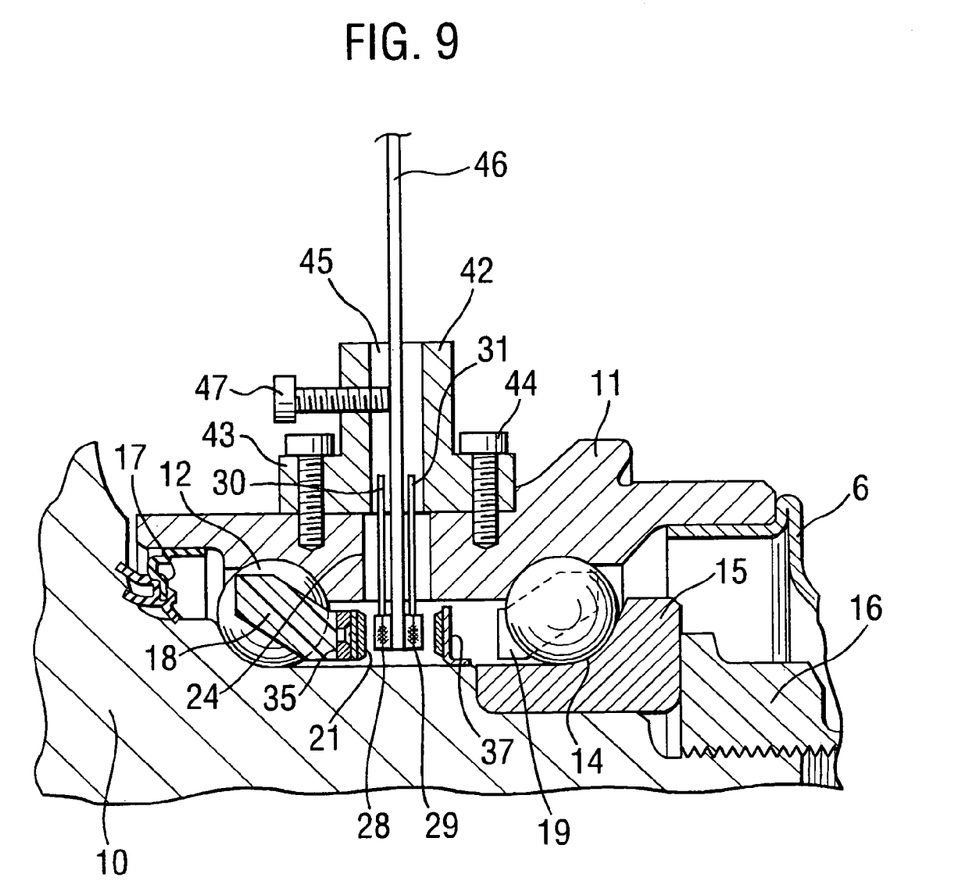
FIG. 9 is a schematic sectional side view of an eighth embodiment of a wheel bearing assembly.

FIG. 9 is again similar to the arrangement shown in FIG. 8 but here the encoder 21 is fixed to the cage 18 with screws. In this arrangement the mounting of the sensors 28, 29 is achieved with the aid of a mounting block 42. The mounting block 42 has a flange 43 affixed with screws 44 to the outer bearing ring 11. A bore 45 in the block 42 is co-axial with the bore 24 in the ring 11. An elongate carrier 46 extends through the bores 45, 24 and mounts the sensors 28, 29 face-to-face in opposite directions. A further screw 47 is received in a wall of the block 42 to penetrate the bore 45 and the screw can be used to adjustably locate with the carrier 46.

Figure 10:
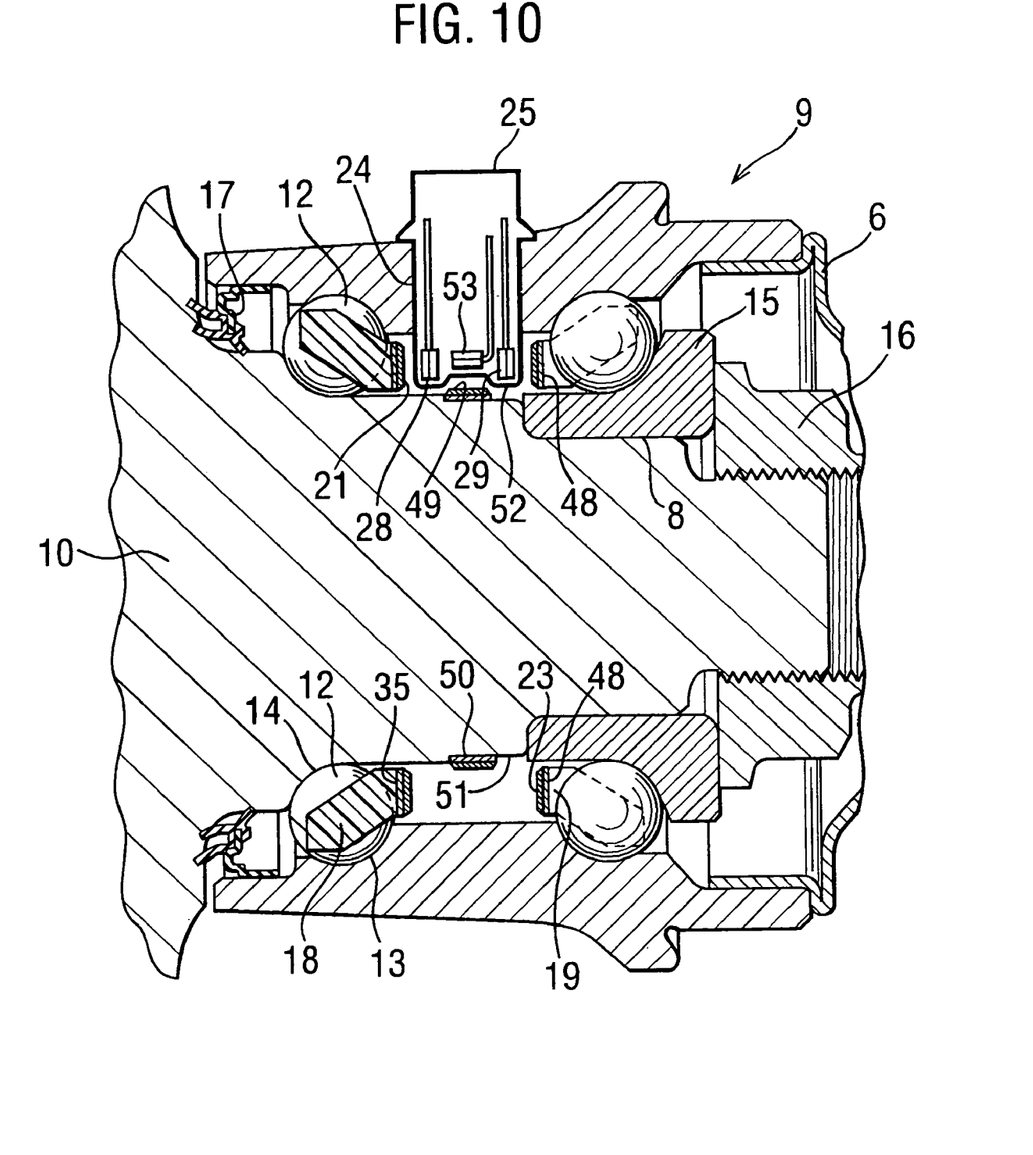
FIG. 10 is a schematic sectional side view of a ninth embodiment of a wheel bearing assembly.

In the assemblies and arrangements depicted in the drawings and described hereinbefore there is two encoders and two sensors. In FIG. 10 a modified arrangement is depicted which uses three encoders and three sensors. Thus in FIG. 10 a first encoder 21 is mounted on an outer end surface 35 of the cage 18 and takes a radial orientation. A second encoder 23 is mounted on the inwardly directed end face 48 of the cage 19 in confronting relationship to the encoder 21 and likewise take a radial orientation. The encoders 21, 23 are in radial alignment but spaced apart axially. A third encoder 49 is mounted on a support ring 50 fitted in a shallow recess 51 in the inner surface of the inner ring 10. The third encoder 49 takes an axial orientation. The sensors associated with the encoders are again supported by a common housing 25 located in their bore 24 in the outer bearing ring 11. In this case the radially orientated sensors 28, 29 associated with the encoders 21, 23 are located in an annular ridge portion 52 at the end of the housing 25 while a further sensor 53 associated with the third encoder 49 and located in an axial orientation is located centrally of the inner end of the housing 25 within the end ridge portion 52 and radially offset therefrom.

What is claimed is:

1. A wheel bearing assembly composed of inner and outer bearing rings, one of which rotates and the other of which remains stationary, two sets of rolling elements between the rings and in angular contact with tracks defined by the rings, each set of rolling elements being spaced in the direction of the axis of rotation with each set of rolling elements retained by one of two cages and a sensing arrangement composed of at least two annular encoders each with alternate north and south magnetic poles and at least two sensors operably associated with the encoders and each serving to provide electrical signals generated by the passage of the poles of the associated encoder;

wherein one of the encoders is mounted on the rotatable one of the bearing rings and, the other of the encoders is mounted on one of the cages and each of said sensors and encoders is disposed axially, between the sets of rolling elements.

2. An assembly according to claim 1, wherein the magnetic poles of the encoders are orientated parallel to the rotational axis.

3. An assembly according to claim 1, wherein the magnetic poles of the encoder are orientated radially relative to the rotational axis.

4. An assembly according to claim 1, wherein the magnetic poles of at least one of the encoders are orientated radially relative to the rotational axis and the magnetic poles of at least one other of the encoders are orientated parallel to the rotational axis.

5. An assembly according to claim 1, wherein the encoders are spaced in a radial and an axial sense.

6. An assembly according to claim 1, wherein the encoders are spaced axially but aligned radially in relation to the rotational axis.

7. An assembly according to claim 1, wherein the encoder mounted on said rotatable bearing ring is mounted on a component mounted onto said rotatable bearing ring.

8. An assembly according to claim 1, wherein the sensors are mounted in a housing fitted into a bore in the other stationary bearing ring so the housing locates the sensor in sensing vicinity to the associated encoders.

9. An assembly according to claim 1, wherein the sensors are mounted in a bore in the other stationary bearing ring.

10. An assembly according to claim 1 wherein a third encoder is mounted for rotation on the other of the cages.

* * * * *